S. Littlefield,
Circular Saw Mill.

Nº 25,972.          Patented Nov. 1, 1859.

Witnesses:
Benja J. Henrich
John M. Goodwin

Inventor:
S. Littlefield

UNITED STATES PATENT OFFICE.

S. LITTLEFIELD, OF ALFRED, MAINE.

SAWING-MACHINE.

Specification of Letters Patent No. 25,972, dated November 1, 1859.

*To all whom it may concern:*

Be it known that I, SYLVESTER LITTLEFIELD, of Alfred, in the county of York and State of Maine, have invented a new and useful Improvement in Sawmills; and I do hereby declare that the following is a full, clear, and exact description of the same, reference being had to the accompanying drawing, forming a part of this specification, in which—

Figure 1:
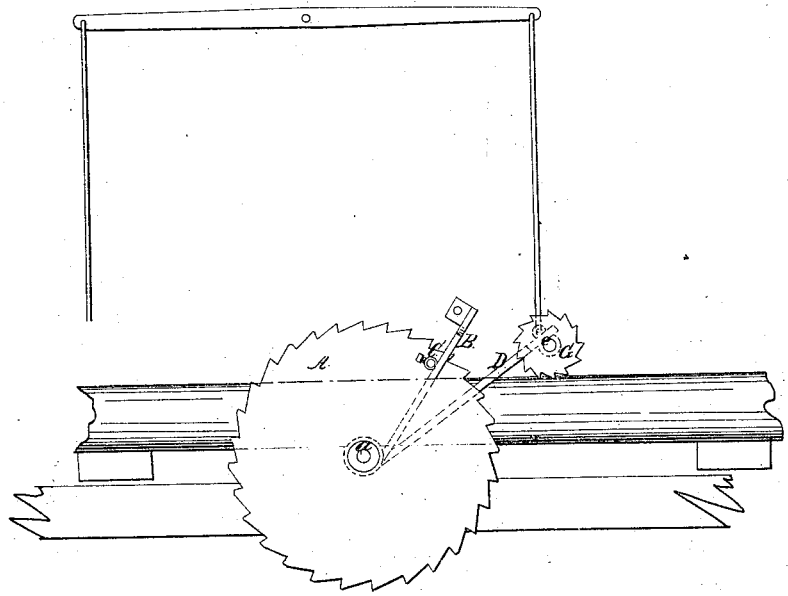
Figure 2:
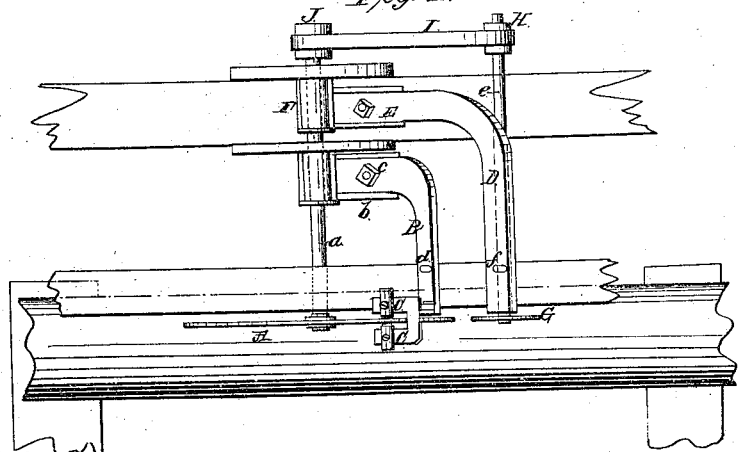

Figure 1 represents a front elevation of my invention. Fig. 2 is a plan or top view of ditto.

Similar letters in both views refer to corresponding parts.

This invention consists in combining with a circular saw on a vibrating adjustable arm an auxiliary saw in such a manner that the same can readily and instantaneously be adjusted to the varying thickness of the log for the purpose of removing the bark and clearing the track before the main saw; and it also consists in arranging an arm with two guides in such a manner that it vibrates on the arbor of the saw, so that it can be raised and lowered instantaneously, and that it, together with the guides, can be adjusted according to the diameter of the saw.

To enable those skilled in the art to make and use my invention I will proceed to describe it.

A represents a circular saw mounted on an arbor, *a*. The saw is intended to cut through logs as the same are brought from the woods. The irregularity of the surface of such logs, and the bark covering them causes the saw to vibrate and to make a bad and uneven cut.

To prevent the vibration of the saw, and to make it run steady and produce a smooth cut I have arranged on the arbor, *a*, a swinging arm, B, that is adjustable in the guide plate, *b*, to which it is secured by means of a screw bolt, *c*. This bolt fits into a slot in the guide plate, so that the arm can be drawn in and out. Secured to the outer end of this arm are two guides, C, that are brought close up to the periphery of the saw near to the log. By means of the slot in the guide plate, *b*, said guides are adjustable to different sized saws. A loop, *d*, that is secured to the upper side of the arm, B, serves to raise or lower the arm by means of a cord running over a roller, or by some other means, in order to bring the guides clear of any obstructions such as boughs on the surface of the log.

An arm, D, similar to the arm, B, is made adjustable in a guide plate, E, that is secured to a sleeve, F, on the arbor, *a;* and attached to this arm are the bearings for an arbor, *e*. This arbor carries on one end an auxiliary saw, G, that stands exactly in line with the main saw, A, and motion is imparted to the same by means of a pulley, H, which connects by means of a belt, I, with a pulley, J, on the arbor, *a*, of the main saw. By thus making the center of the driving pulley identical with the center around which the arm, D, swings said arm can be brought to any desired position without interfering with the motion of the arbor, *e*. It must however be remarked that the arm, D, might be made to swing on any other shaft parallel with the arbor, *a*, provided that the driving pulley is located on the same shaft. A loop, *f*, on the upper side of the arm, D, serves to raise or lower the auxiliary saw, G, and a lever with ropes may be used for this purpose, as represented in red outlines in Fig. 1.

The auxiliary saw, G, serves to take off the bark in front of the main saw and to clear the track, and by means of the loop, *f*, it is raised clear of any obstructions which may occur in the surface of the log.

Instead of the saw, G, a revolving plate with cutters may be used, and in some cases such a plate may be found better adapted to the purpose than a saw.

What I claim as new, and desire to secure by Letters Patent, is:—

1. Combining with a circular saw, A, on a vibrating adjustable arm, D, an auxiliary saw, G, substantially as and for the purpose described.

2. Arranging an arm, B, with two guides, C, in such a manner that it vibrates on the arbor of the saw, and that it can be raised and lowered instantaneously, substantially as and for the purpose specified.

SYLVESTER LITTLEFIELD.

Witnesses:
BENJA. J. HERRICK,
JOHN M. GOODWIN.